(12) United States Patent
Igo et al.

(10) Patent No.: US 12,705,707 B2
(45) Date of Patent: Aug. 11, 2026

(54) VIDEO BACKGROUND BLUR USING LOCATION DATA

(71) Applicant: Google LLC, Mountain View, CA (US)

(72) Inventors: Christopher James Igo, Boulder, CO (US); Ameet Jani, Campbell, CA (US); Jenna Elizabeth Drumright, San Francisco, CA (US); Lauren Marie Bedal, San Francisco, CA (US); Eiji Hayashi, Sunnyvale, CA (US); Leonardo Giusti, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 286 days.

(21) Appl. No.: 18/446,027

(22) Filed: Aug. 8, 2023

(65) Prior Publication Data

US 2025/0054112 A1 Feb. 13, 2025

(51) Int. Cl.

| | |
|---|---|
| ***G06T 5/70*** | (2024.01) |
| ***G06T 5/20*** | (2006.01) |
| ***G06T 7/11*** | (2017.01) |
| ***G06T 7/215*** | (2017.01) |
| ***G06T 7/579*** | (2017.01) |

(Continued)

(52) U.S. Cl.

CPC .................. *G06T 5/70* (2024.01); *G06T 5/20* (2013.01); *G06T 7/11* (2017.01); *G06T 7/215* (2017.01); *G06T 7/579* (2017.01); *G06T 7/593* (2017.01); *G06T 11/00* (2013.01); *G06T 2207/10016* (2013.01)

(58) Field of Classification Search

CPC ..... G06T 5/70; G06T 5/20; G06T 7/11; G06T 7/215; G06T 7/579; G06T 7/593; G06T 11/00; G06T 2207/10016; G06T 2207/10028; G06T 5/50; G06T 2207/20221; G06T 5/73; G06T 2207/10024; G06T 2207/20012; G06T 7/50; G06T 2207/30196; H04N 23/951; H04N 5/2226; H04N 23/67; H04N 23/673; H04N 23/80; H04N 5/2621; H04N 5/272; H04N 13/239; H04N 13/25; H04N 2013/0081; H04N 23/959; H04N 23/958

See application file for complete search history.

(56) References Cited

U.S. PATENT DOCUMENTS

| | | | | |
|---|---|---|---|---|
| 7,106,376 B1 * | 9/2006 | Anderson | ............. | G03B 13/36 348/349 |
| 9,538,081 B1 * | 1/2017 | Zhou | ...................... | H04N 23/68 |

(Continued)

*Primary Examiner* — Michael S Osinski
(74) *Attorney, Agent, or Firm* — DORITY & MANNING P.A.

(57) ABSTRACT

Methods and systems for providing background blur in video data are provided herein. The method includes receiving, by an electronic processor, video data from a video capture device and receiving, by the electronic processor, location data for an object in the video data from a range sensor, wherein the location data indicates a distance of the object from the video capture device. The method also includes determining, by the electronic processor, a zone of inclusion for the video data based on the video data and the location data and applying continuous and undisrupted background blur to pixels of the video data located outside the zone of inclusion.

9 Claims, 7 Drawing Sheets

(51) Int. Cl.
*G06T 7/593* (2017.01)
*G06T 11/00* (2026.01)

(56) References Cited

U.S. PATENT DOCUMENTS

| | | | | |
|---|---|---|---|---|
| 11,710,222 | B2 * | 7/2023 | Marc | G06T 5/50 382/103 |
| 12,354,238 | B2 * | 7/2025 | Feng | H04N 5/2226 |
| 2005/0157204 | A1 * | 7/2005 | Marks | H04N 5/272 348/222.1 |
| 2012/0044400 | A1 * | 2/2012 | Okada | H04N 23/958 348/E5.045 |
| 2013/0113962 | A1 * | 5/2013 | Li | H04N 5/2621 348/240.2 |
| 2013/0279799 | A1 * | 10/2013 | Shimura | G06T 5/73 382/154 |
| 2013/0329125 | A1 * | 12/2013 | Hamano | H04N 23/673 348/349 |
| 2015/0002545 | A1 * | 1/2015 | Webster | G09G 5/377 345/634 |
| 2015/0085179 | A1 * | 3/2015 | Van Heugten | H04N 23/673 348/349 |
| 2016/0219227 | A1 * | 7/2016 | Sato | H04N 23/951 |
| 2017/0024006 | A1 * | 1/2017 | Kwon | G06T 7/13 |
| 2018/0070023 | A1 * | 3/2018 | Oh | H04N 5/2625 |
| 2018/0095342 | A1 * | 4/2018 | Mogami | H04N 23/67 |
| 2018/0276833 | A1 * | 9/2018 | Yoon | G06T 3/40 |
| 2019/0150848 | A1 * | 5/2019 | Hayami | G06T 7/0012 |
| 2019/0222806 | A1 * | 7/2019 | Soppelsa | H04N 5/272 |
| 2020/0074657 | A1 * | 3/2020 | Zhou | G06T 5/40 |
| 2022/0166899 | A1 * | 5/2022 | Yokomizo | H04N 1/40068 |
| 2022/0317453 | A1 * | 10/2022 | Jeong | G02B 27/0172 |
| 2023/0292004 | A1 * | 9/2023 | Ishibashi | H04N 23/64 |

* cited by examiner

VIDEO BACKGROUND BLUR USING LOCATION DATA

FIELD

The present disclosure relates generally to performing blurring of backgrounds in video data. More particularly, the present disclosure relates to using location detection, such as range sensors, to determine which portions of video data are part of a background of the video data, and subsequently blurring the background portions of the video data.

BACKGROUND

Blurring pixels in the background of video helps to obfuscate details in the video by providing video pixels that are intentionally displayed as out of focus, which helps to hide details provided in the blurred video pixels. This is especially useful in video conferencing and video streaming applications, as persons with their cameras on and displaying can be appropriately displayed in focus while not having to worry about what may be occurring in the background of the video because details are hidden by the blur of pixels.

SUMMARY

Aspects and advantages of embodiments of the present disclosure will be set forth in part in the following description, or can be learned from the description, or can be learned through practice of the embodiments.

One aspect of the present disclosure provides a computer-implemented method for performing background blurring in video data. The method includes receiving, by an electronic processor, video data from a video capture device and receiving, by the electronic processor, location data for an object in the video data from a range sensor, wherein the location data indicates a distance of the object from the video capture device. The method also includes determining, by the electronic processor, a zone of inclusion for the video data based on the video data and the location data and applying continuous and undisrupted background blur to pixels of the video data located outside the zone of inclusion.

Another aspect of the present disclosure provides a computing system for performing background blurring in video data. The computing system includes an electronic processor and a non-transitory, computer-readable medium comprising instructions that, when executed by the electronic processor, cause the electronic processor to perform operations. The operations include receiving video data from a video capture device and receiving location data for an object in the video data from a range sensor, wherein the location data indicates a distance of the object from the video capture device. The operations also include determining a zone of inclusion for the object based on the video data and the location data and applying continuous and undisrupted background blur to pixels of the video data located outside the zone of inclusion. The operations further include detecting a movement of the object in the video data and updating the application of the background blur based on a new location of the object in the video data.

A further aspect of the present disclosure provides a non-transitory, computer readable medium comprising instructions that, when executed by an electronic processor, cause the electronic processor to perform operations for performing background blurring in video data. The operations include receiving video data from a video capture device and receiving location data for a subject object in the video data from a range sensor, wherein the location data indicates a distance of the subject object from the video capture device. The operations also include receiving, by the electronic processor, other location data for one or more other pixels in a background of the video data from the range sensor and determining a zone of inclusion for the subject object based on the video data and the location data. The operations further include applying continuous and undisrupted background blur to pixels of the video data located outside the zone of inclusion, wherein an amount of blur applied to each pixel is determined based on the received other location data for the one or more pixels in the background of the video data.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
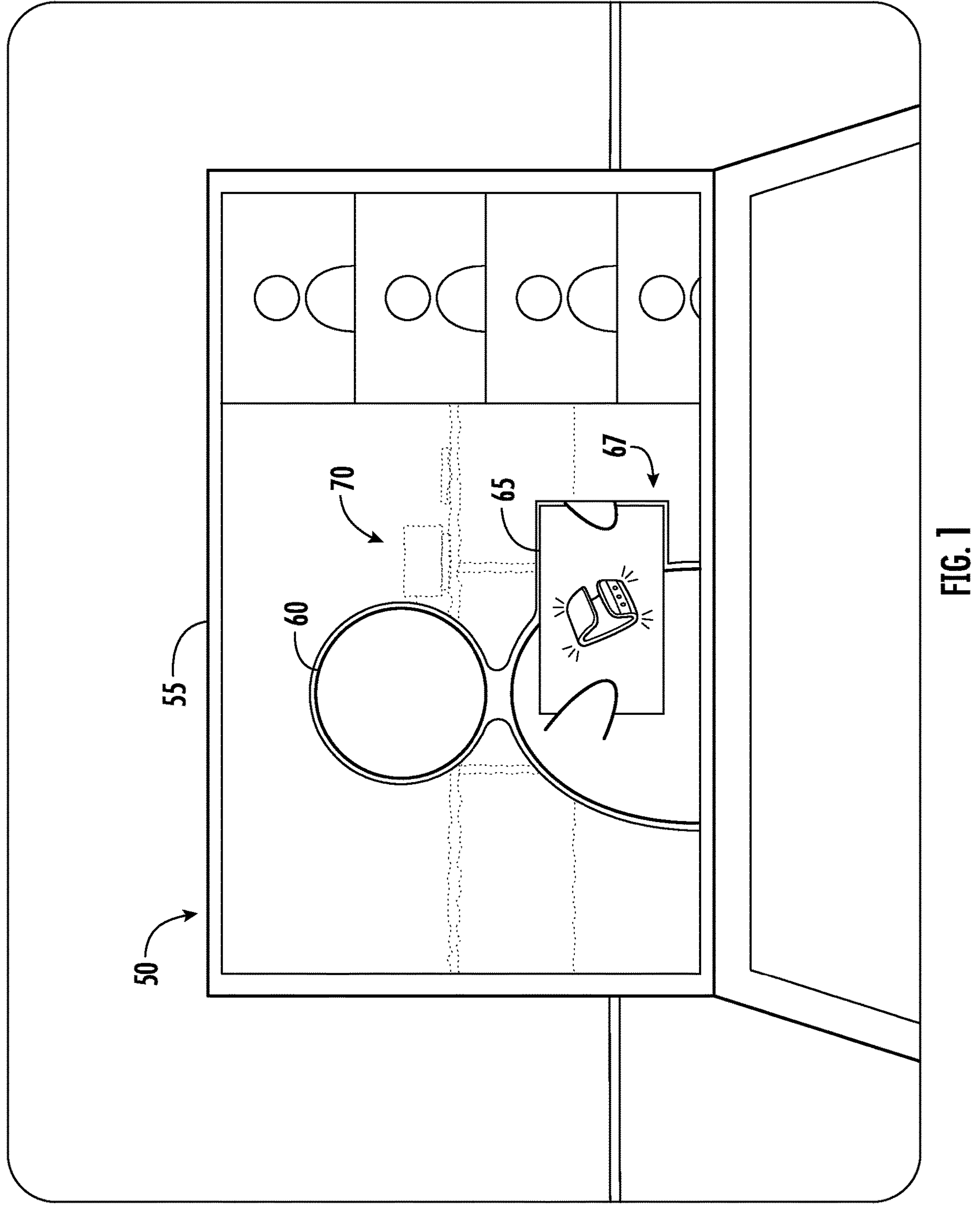
FIG. 1 depicts a user device with video blurring functionality according to some implementations of the present disclosure.

Reference numerals that are repeated across plural figures are intended to identify the same features in various implementations.

DETAILED DESCRIPTION

Generally, the present disclosure is directed to providing background blur for video using location data. More specifically, blurring in video helps to obfuscate details in the video by providing video pixels that are intentionally displayed as out of focus, which helps to hide details provided in the video pixels. This is especially useful in video conferencing and video streaming applications, as persons with their cameras on and displaying can be appropriately displayed in focus while not having to worry about what may be occurring in the background of the video because details are hidden by the blur of pixels.

Current video blur systems, especially those that do not blur a subject of the video but do blur the background of the video, suffer from two noticeable drawbacks. Objects and motions that are behind a user can cause momentary distortions to the performance of the background blur (e.g., coming into focus and not being blurred or causing a previously blurred portion of the background, especially around the subject, to momentarily unblur and reveal details of the background) and objects a user intends to show in video calls are blurred out (e.g., attempting to show a document or other object by holding it up to the camera), rendering the user unable to show the object to other participants of the video call.

As a solution to these problems, example systems describe herein define a zone of inclusion around an identified object in the video data using location data of that identified object. For example, using a range sensor, a user sitting in a foreground of a video, or the portion of the video data determined to be closest to the camera capturing the video data by, for example, using data from the range sensor or other techniques. The foreground can be identified because the user is closer to the camera than objects in the background, or the portion of the video data determined to be further away from the camera capturing the video data than objects in the foreground. A border in video pixels can be generated (and/or updated) to outline the user as a subject of the video by identifying pixels that contain the user in the video. The pixels can be identified using, among other things, distance information from a range sensor to identify objects, such as the user, that are within a range. The border can be used to define a zone of inclusion. Pixels within the zone of inclusion are not blurred and remain unblurred while the video data is being presented, such as during live-streaming of the video data during a teleconference. Because the pixels within the zone of inclusion remain unblurred and pixels outside the zone of inclusion remain blurred, movements by the subject of the video data will not cause momentary unblurring of pixels outside of the zone of inclusion, thus reducing the instances in which the background (especially right around the border of the user and the background) is momentarily displayed in response to a movement of the user and/or movement in the background of the video while recalculation of pixels to blur is performed.

The proposed approaches further enable the user or another object in the foreground of the video to be tracked, or the position of the subject to be determined and changes in the position of the subject to be identified. The position of the subject can be tracked over time using both video data (e.g., by identifying the subject to track using object recognition and then tracking the subject as the position of the subject changes in the pixels of the video data) and location data (e.g., by detecting changes in measured distances from the range sensor to various objects in the environment, including the subject). Blur can therefore be applied even when the subject moves in the video data. Pixels can be added to or removed from the zone of inclusion based on the changed position of the subject and immediately blurred or unblurred, which reduces or eliminates instances of portions of the background becoming unblurred when a subject moves in video data. This reduction occurs because pixels are added or removed from the zone of inclusion and automatically blurred or unblurred due to inclusion or exclusion, instead of having to determine a new position of the subject and redetermine which pixels to blur.

Another aspect provided herein is dynamic blurring. Dynamic blurring can be selecting an amount or magnitude of blur for a particular pixel based on the distance from the capture device to a point in an environment the pixel represents. For example, based on a distance to a point in the background from the range sensor, an amount of blur (e.g., more extreme or less extreme blur) can be applied to pixels in the background. This can allow objects that may be important that are just outside the zone of inclusion and that are close to the range sensor (e.g., an object on a user's desk) to be less blurry than, for example, objects hanging on a wall on the opposite side of a room of the user.

The proposed invention provides the technical benefit of adding additional data into video blurring services, which can reduce errors in video blurring (e.g., portions of the background being shown when the user moves, objects being blurred when placed in front of the user in the video, and the like). By using the location data in addition to video data, the proposed invention can more accurately determine exactly where in the environment portrayed by the video data an object is and, therefore, more accurately determine where and when video blur should be applied to pixels of the video data.

With reference now to the Figures, example implementations of the present disclosure will be discussed in further detail.

FIG. 1 depicts an example user interface 10 illustrating video data with background blurring according to some implementations of the present disclosure. The example user interface 50 shows an example of content that has been blurred by a background blur generation system (as described below).

As shown in FIG. 1, the user interface 50 shows video data 55 for a teleconferencing application, which includes user 60 presenting to other users. The user 60 has implemented background blurring for the user interface 50 using, for example, one or more options for presenting video data 55 in the user interface 50. During presentation by the user 60 to the other users, the user 60 may wish to show an object, such as drawing 65, to the other users in the teleconference. Because the user 60 is within a zone of inclusion 67 (as described above), the user 60 remains unblurred while moving drawing 665 into the zone of inclusion 67, and drawing 65 is not blurred as it moves into the zone of inclusion 67 because the zone of inclusion 67 defines areas within the video data 55 that remain unblurred. Meanwhile, background 70 remains blurred as the user 60 presents the drawing 65.

Figure 2:
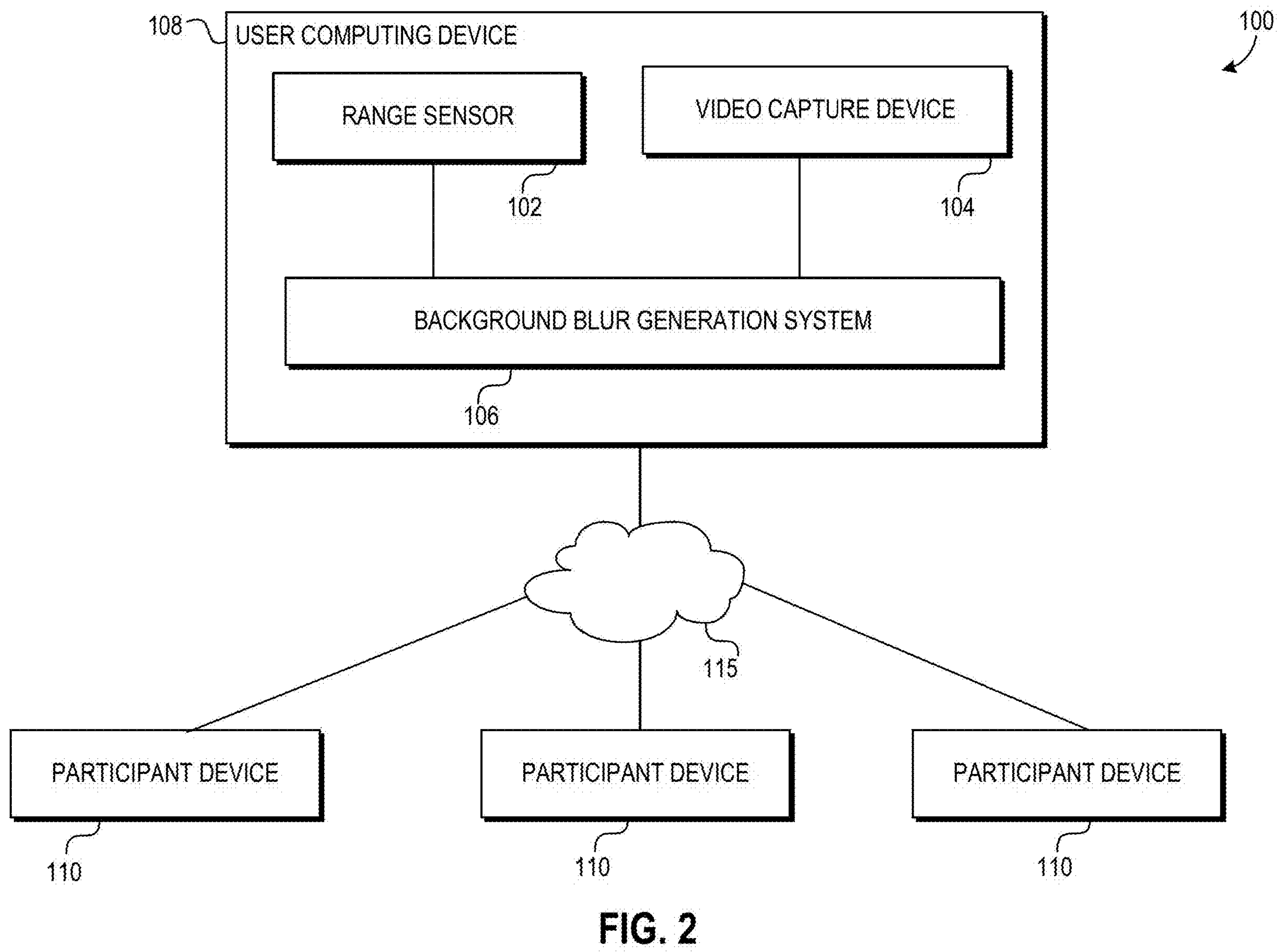
FIG. 2 depicts a user device with video blurring functionality according to some implementations of the present disclosure.

FIG. 2 depicts a system 100 with video blurring functionality. User device 108 can be coupled to a range sensor 102, a video capture device 104, and a background blur generation module 106. In some embodiments, the background blur generation module 106 can be wholly contained in a memory of the user device 108. In other embodiments, the background blur generation model can be partially or wholly contained in a memory of a server and can be accessed by the user device 108 via a communication connection.

The range sensor 102 determines a distance in between the user device 108 and objects in an environment in which the user device 108 is operating, such as a person sitting at the user device 100. The environment of the user device 108 is an area in which the user device is contained, such as a room, a vehicle, or other space. The video capture device 104 captures video data, which is data that provides a visual depiction of the environment.

The background blur generation module 106 receives at least one of the location data, or distance data indicating distances from the user device 108 to various objects in the environment from the range sensor 102 or the video data from the video capture device 104 or both the location data and the video data. Based on the received location data and the received video data, the background blur generation system 106 determines a zone of inclusion for the video data. The zone of inclusion captures a primary object of the video data (e.g., a person sitting at a computer or another object), or subject of the video data, as a group of pixels. Pixels within this zone of inclusion are left unblurred. Pixels of the video data that are outside the zone of inclusion are determined to be in the background of the video. The zone of inclusion is defined by a boundary of exclusion. The boundary of exclusion is a boundary or border of pixels representing the edge separating the subject of the video from the background. The pixels determined to be in the background of the video by the background blur generation module 106 are then blurred by the background blur generation module 106. The pixels are continuously blurred without disruption (e.g., without stopping blurring of pixels near the outline of a subject if the subject moves).

The user device 100 can also be in communication with one or more participant devices 110 via network 115. The user device 100 presents video data, including the blurred background and the non-blurred zone of inclusion, to users of the one or more participant devices 110 via the network 115. This can occur during, for example, an audio-visual presentation, a video conference, or other situation in which the one or more participant devices 110 are receiving video data from the user device 100 over the network 115.

Figure 3:
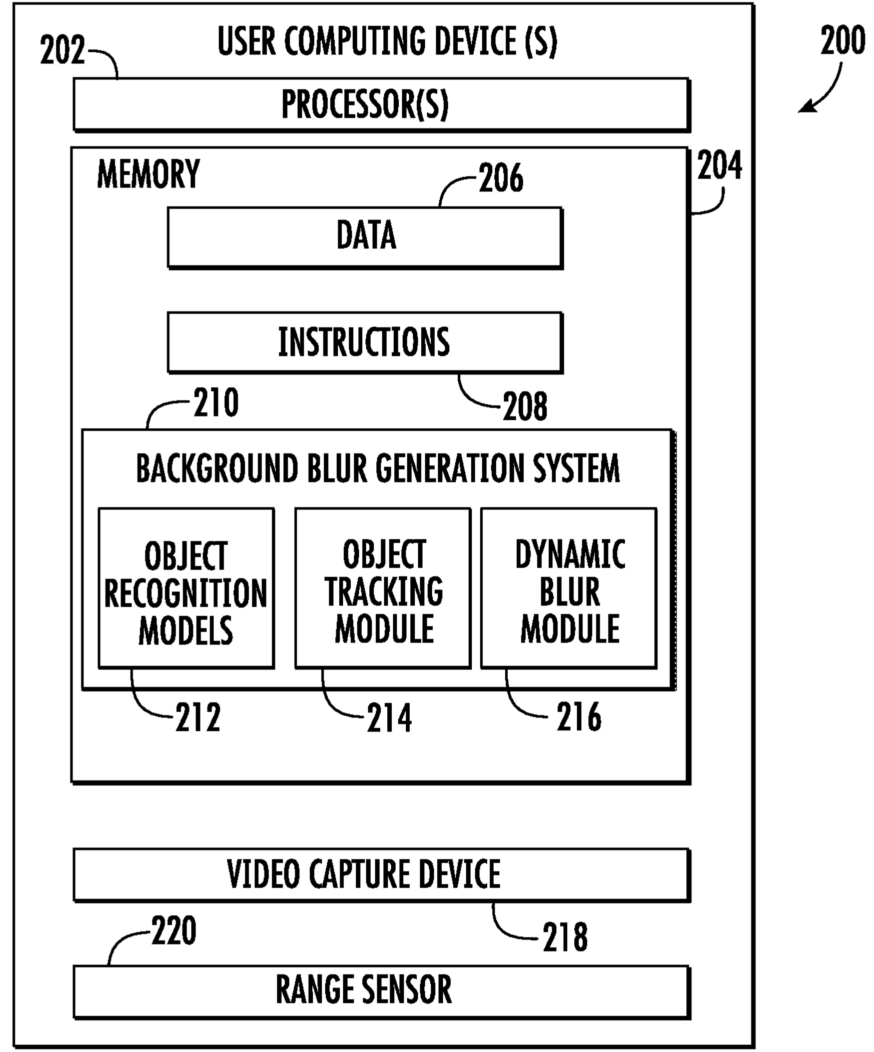
FIG. 3 depicts a flow chart diagram of an example method to perform background blurring of video data according to some implementations of the present disclosure.

FIG. 3 depicts a user computing device 200 with video blurring functionality according to some implementations of the present disclosure. The user computing device 200 represents a more detailed example for the user device 100 of FIG. 2.

The user computing device 200 can be any type of computing device. Additional details regarding example implementations of the user computing device 200 can be found below with regards to FIG. 6.

The user computing device 200 includes one or more processors 202 and a memory 204. Additional details regarding example processors 202 and memory 204 can be found below with regards to FIG. 6.

The memory 204 can include a background blur generation system 210, which can be similar to the background blur generation system 106 as described above. Generally, the background blur generation system 210 can receive location data and video. Based on the received location data and received video data, the background blur generation system 210 can determine which pixels of the video data are part of the background of the video data (e.g., do not contain the subject of the video data). The background blur generation system 210 can then blur the pixels representing the background of the video data. The background blur generation system 210 can provide continuous and undisrupted blur for pixels outside the zone of inclusion. In other words, the blur applied to those pixels is not interrupted because of movement of the subject in the video data, because the zone of inclusion defines pixels that are not blurred based on received location and/or range data. Instead of having to re-identify an object in video data and re-identify pixels to blur (which causes portions of the background to be unblurred), the background blur generation system 210 can use the range data to more quickly and efficiently track the subject as the subject moves, which reduces the amount of time needed to identify pixels to blur.

In some implementations, the background blur generation system 210 can include object recognition models 212. For example, the object recognition models 212 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). The object recognition models 212 can be models that are trained to identify the presence of objects from video data, such as a person sitting at a computer, an object being held up to a camera, and the like.

The background blur generation system 210 can also include an object tracking module 214. The object tracking module 214 can track movement of one or more identified objects, such as a subject of the video data, once the presence of the object(s) is detected in the video data. Tracking an object includes determining a position of the object within video data and identifying when the object changes position within the video data. For example, the object tracking module 214 can determine when a subject of the video data moves (e.g., a person shifts in a seat or moves to grab something on a desk) and track the movement of the subject through the received video data by, for example, tracking changes in pixels of the video data (e.g., color changes, brightness changes, and the like) and/or tracking changes in location data (e.g., a distance from the subject of the video data changes, a new object comes in front of the subject of the video data, and the like).

The background blur generation system 210 can further include dynamic blur module 216. The dynamic blur module 216 can determine an amount of blur for each pixel in the background of the video data. For example, based on a distance from the user computing device 200 to a location represented by a pixel in the background of the video data, the dynamic blur module 216 can determine an amount of blur to be applied to the pixel. More distant pixels can be more heavily blurred, while pixels that are closer to the user device 200 can be less heavily blurred.

The user computing device 200 is coupled to a video capture device 218, such as a camera. The video capture device 218 generally captures video data as pixels for use by the user computing device 200, such as in teleconferencing applications, video streaming applications, and the like.

In some embodiments, the video capture device 218 can include two or more capture devices positioned at different angles for capturing video data. Video data from both capture devices can be provided to the user device 200 to, for example, perform processing using the principle of parallax to determine a distance of an object from the capture devices. Parallax is a displacement or difference in the apparent position of an object viewed along two different lines of sign, and can be measured by using the angle of inclination between the two lines of sight. This angle can be used to determine distances of objects. Based on the lines of sight from the two capture devices, two different sets of video data of the same object can be captured, and the user device 202 can use the two different sets of video data to determine a distance of the object from the user device or from the video capture device 218 based on the parallax.

The user device 200 also includes a range sensor 220. The range sensor 220, in some embodiments, can be the first video capture device or the second video capture device as described above. In other embodiments, the range sensor 220 can be a different type of sensor designed to detect a distance between the range sensor 220 and one or more objects, such as a radar sensor or a lidar sensor. The range sensor 220 detects objects and returns distances between the detected object(s) and the user computing device 200 as location data. The location data describes the distance from the user computing device 200 to the detected object(s). The location data can also provide other information about the detected object(s) to the user computing device 200, such as an angle of the detected object(s) relative to the range sensor 220 in a horizontal and/or vertical direction. As described below, based on the received location data from the range sensor 220 and the video data received from the video capture device 218, the background blur generation system 210 can perform background blurring of the video data using the background blur generation system 210 by identifying pixels that correspond to detected object(s) in the video data.

In some embodiments, the range sensor 220 can have a predefined maximum range at which it captures distance data. In other embodiments, the range sensor 220 can have a variable maximum range at which it can capture data, and the maximum range can be determined based on, for example, a maximum range captured as the range sensor 220 is initialized for capturing distance data.

Figure 4:
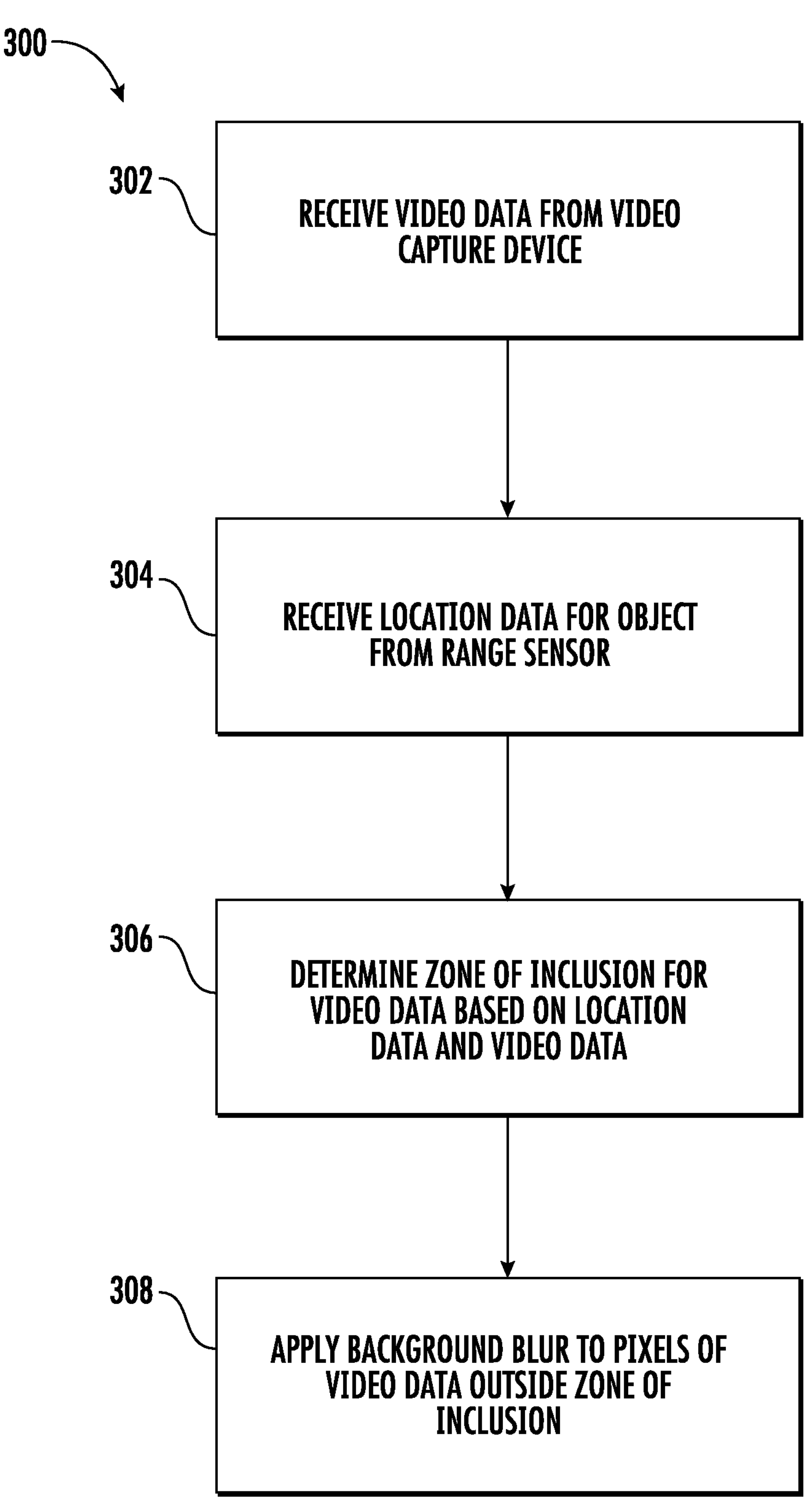
FIG. 4 depicts a flow chart diagram of an example method to perform background blurring of video data according to some implementations of the present disclosure.
Figure 5:
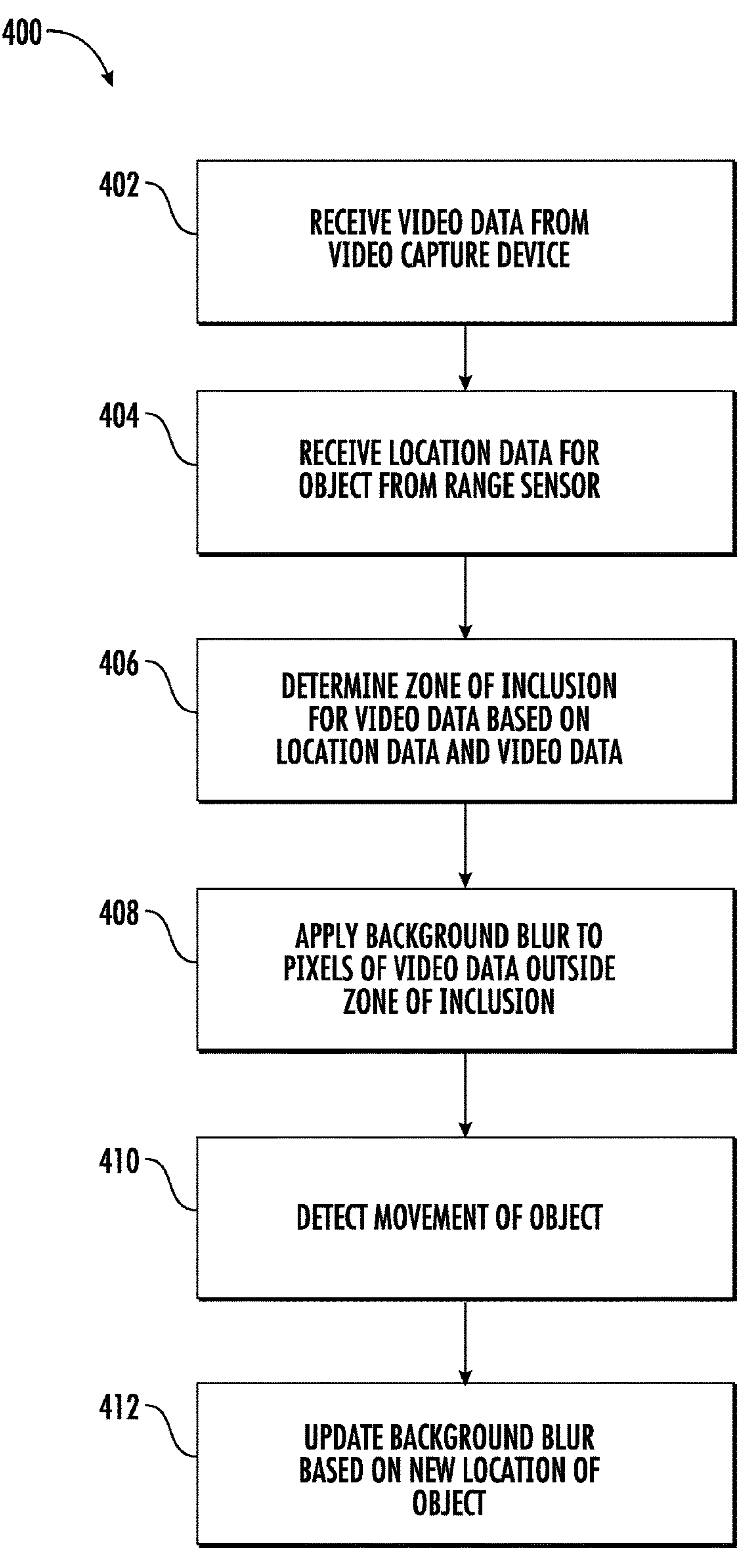
FIG. 5 depicts a flow chart diagram of an example method to perform background blurring of video data according to some implementations of the present disclosure.

FIG. 4 is a flow diagram of an example method 300 for performing background blurring in video data in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the background blur generation system 106 of FIG. 2 or another suitable computing system. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 302, a computing system receives video data from a video capture device. The video data can include video data of an environment in which the computing system is operating and can include pixels depicting the environment, such as one or more objects present in the environment.

At operation 304, the computing system receives location data, including distance information, for at least one object present in the video data from a range sensor, such as a radar sensor or lidar sensor. In some embodiments, the range sensor can be a second video capture device, and the distance data in the location data can be determined by the computing system based on parallax between the two sets of received video data, as described above with regards to FIG. 2.

At operation 306, the computing system determines a zone of inclusion for the video data based on the received video data and the received location data. The zone of inclusion is defined by a boundary of exclusion, which separates pixels that contain an object to be unblurred from pixels that include only video data from the background of the environment in which the computing system is operating. The computing system, for example, can determine a closest object to the video capture device by determining a set of pixels in the video data that are associated with distances within a threshold range of distances in the location data, such as a person sitting at a computer looking into the video capture device. The threshold can be pre-determined, such as being a static threshold range of distances stored in memory, or can be determined dynamically. To determine the threshold dynamically, the computing system can receive distance data to points in the environment and can identify one or more objects based on a group of points in the environment having similar distances, such as each point in the group of points having a distance measurement from the computing system be within three inches of the distance measurement from the computing system to each other point in the group.

The subject of the video data sitting in front of the video capture device can be located at a range of much shorter distances (e.g., a person can have a face and shoulders, which can have different distances from the video capture device, with each point of the face and shoulders still falling within a threshold distance distance range, such as being within six inches of other points constituting the face and shoulders of the person) than the pixels in the video data associated with the background of the environment. The pixels associated with these distances representing the closest object to the video capture device can be included in the zone of inclusion, and boundary of exclusion can be created along the pixels at the edge of the zone of inclusion.

At operation 308, the computing system can apply continuous and undisrupted background blur to pixels of the video data located outside the zone of inclusion. In other words, all pixels located within the boundary of exclusion (e.g., in the zone of inclusion) are presented on a software application (e.g., a video conferencing application, video streaming application, and the like) as unblurred. All pixels outside the boundary of exclusion are presented as blurred by reducing the resolution of the pixels by a specific amount to obscure what would otherwise be present in the video data at the pixel location.

FIG. 4 is a flow diagram of an example method 400 for performing background blurring in video data when a moving object is present in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the background blur generation system 106 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 402, a computing system receives video data from a video capture device. The video data can include video data of an environment in proximity to the computing system and can include pixels depicting the environment, such as one or more objects present in the environment.

At operation 404, the computing system receives location data, including distance information, for at least one object present in the video data from a range sensor, such as a radar sensor or lidar sensor. In some embodiments, the range sensor can be a second video capture device, and the distance data in the location data can be determined by the computing system based on parallax between the two sets of received video data, as described above with regards to FIG. 2.

At operation 406, the computing system determines a zone of inclusion for the video data based on the received video data and the received location data. The zone of inclusion is defined by a boundary of exclusion, which separates pixels that contain an object to be unblurred from pixels that include only video data from the background of the environment in which the computing system is operating. The computing system, for example, can determine a closest object to the video capture device by determining a set of pixels in the video data that are associated with distances within a threshold range of distances in the location data, such as a person sitting at a computer looking into the video capture device. The person sitting in front of the video capture device will be located at a range of much shorter distances (e.g., face and shoulders having different distances from the video capture device but still falling within a range of "shortest distances") than the pixels in the video data associated with the background of the environment. The pixels associated with these distances representing the closest object to the video capture device can be included in the zone of inclusion, and boundary of exclusion can be created along the pixels at the edge of the zone of inclusion.

At operation 408, the computing system can apply continuous and undisrupted background blur to pixels of the video data located outside the zone of inclusion. In other words, all pixels located within the boundary of exclusion (e.g., in the zone of inclusion) are presented on a software application (e.g., a video conferencing application, video streaming application, and the like) as unblurred. All pixels outside the boundary of exclusion are presented as blurred.

At operation 410, the computing system detects a movement of the subject of the video data that is currently unblurred (e.g., currently represented by the zone of inclusion). In one embodiment, based on received video data, the computing system can determine that one or more pixels in the current zone of inclusion have moved. This can be performed, for example and without limitation, by comparing pixels to prior received video data to detect changes. In another embodiment, the computing system can determine movement of the object based on received location data. For example, if a person leans over to retrieve something from a desk, distances between the video capture device and one or more body parts (face, shoulders, etc.) of the person will change. Based on receiving these changed distances from the range sensor, the computing system can determine that the object closest to the video capture device has moved.

At operation 412, the computing system updates the background blur based on a new location of the object. For example, as described above with regards to 406, a new zone of inclusion (and boundary of exclusion) can be determined based on at least one of video data and location data currently being received by the computing system. The computing system can then update which pixels are blurred or unblurred based on the new boundary of exclusion. By using both the video data and the location data, the computing system can more quickly and accurately determine when an object that is unblurred has moved, and thus reduce or eliminate time in which background objects are unblurred before the blur is updated.

Figure 6:
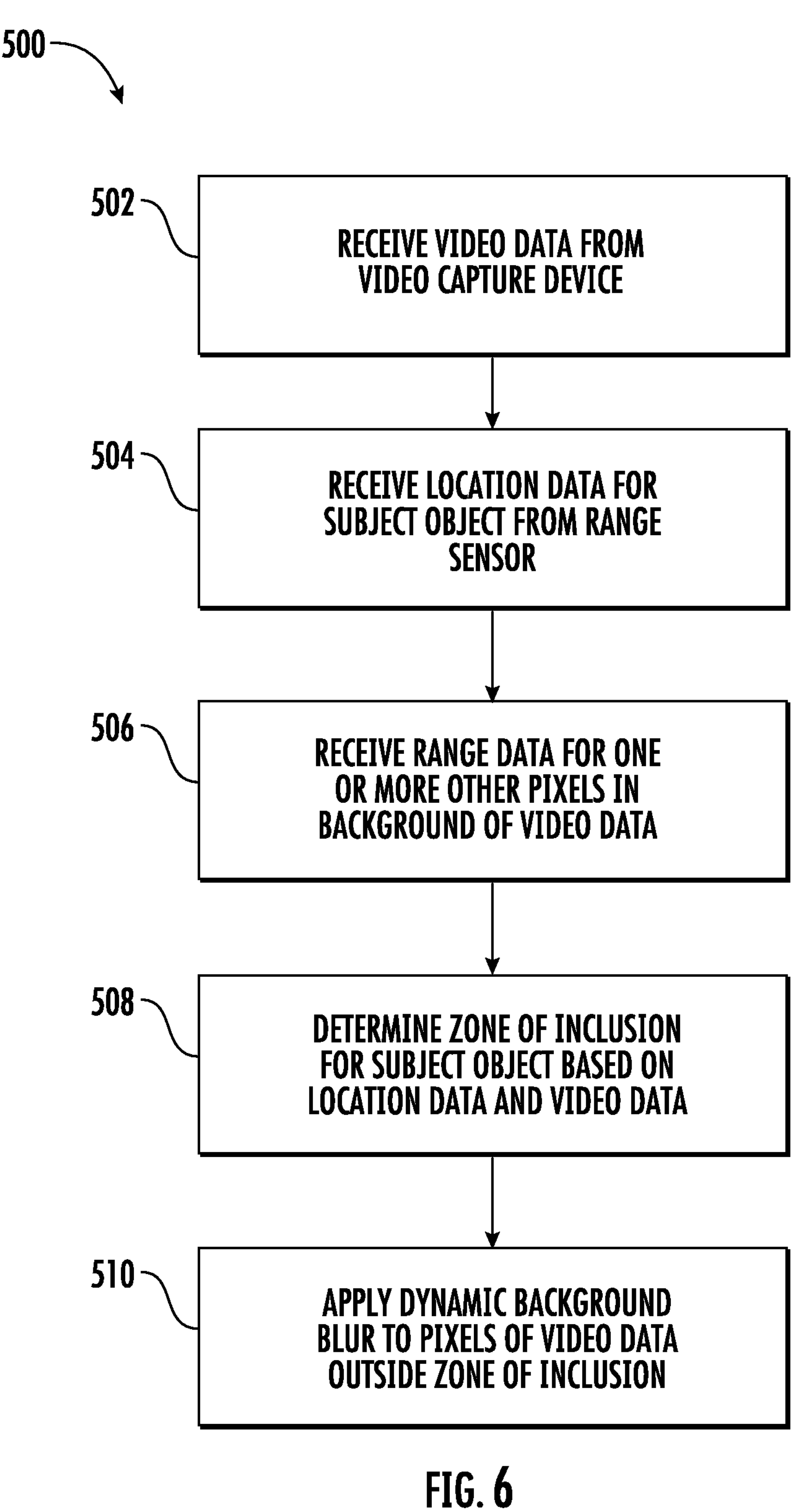
FIG. 6 depicts an example user interface illustrating video data with background blurring according to some implementations of the present disclosure.

FIG. 6 is a flow diagram of an example method 500 for performing dynamic background blurring in video data in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the background blur generation system 106 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, a computing system receives video data from a video capture device. The video data can include video data of an environment in proximity to the computing system and can include pixels depicting the environment, such as one or more objects present in the environment.

At operation 504, the computing system receives location data, including distance information, for a subject present in the video data from a range sensor, such as a radar sensor or lidar sensor. In some embodiments, the range sensor can be a second video capture device, and the distance data in the location data can be determined by the computing system based on parallax between the two sets of received video data, as described above with regards to FIG. 3. The subject can be an object that is in the foreground of the video data. In one example, the subject can be an object being displayed on a desk in front of the computing system, and is the primary subject of the video being presented by the computing system.

At operation 506, the computing system receives range data for the one or more pixels in the background of the video data. In addition to receiving location data for the subject object, distances to one or more pixels that do not represent the subject object can be received.

At operation 508, the computing system determines a zone of inclusion for the subject object based on the received video data and the received location data. The zone of inclusion is defined by a boundary of exclusion, which separates pixels that contain an object to be unblurred from pixels that include only video data from the background of the environment in which the computing system is operating. The computing system, for example, can determine that the subject object is the closest object to the video capture device by determining a set of pixels in the video data that are associated with distances within a threshold range of distances in the location data, such as a person sitting at a computer looking into the video capture device. The person sitting in front of the video capture device will be located at a range of much shorter distances (e.g., face and shoulders having different distances from the video capture device but still falling within a range of "shortest distances") than the pixels in the video data associated with the background of the environment. The pixels associated with these distances representing the closest object to the video capture device can be included in the zone of inclusion, and boundary of exclusion can be created along the pixels at the edge of the zone of inclusion.

At operation 510, the computing system can apply continuous and undisrupted "dynamic" background blur to pixels of the video data located outside the zone of inclusion. In other words, all pixels located within the boundary of exclusion (e.g., in the zone of inclusion) are presented on a software application (e.g., a video conferencing application, video streaming application, and the like) as unblurred. All pixels outside the boundary of exclusion are presented as blurred.

In one embodiment, the amount or degree of blur applied to each pixel is determined based on the received other location data for the one or more pixels in the background of the video data. For example, the other location data can include data indicating a distance of the point in the background represented by each pixel outside the zone of inclusion from the range sensor. The amount of blur for each pixel outside the zone of inclusion can be determined based on the distance of the point in the background represented by each pixel from the range sensor. For example, if a point in the background is only 10 centimeters further from the video capture device than the subject object, the amount of blur for the pixel displaying that point in the environment can be a low blur setting, which allows more details from that pixel to be seen. In contrast, if a point in the background is 1 meter further away from the video capture device than the subject object, a heavier, more intense blur can be applied to the pixel representing that point in the environment, which lets fewer details in the pixel be readily seen.

In another embodiment, one or more pixels in the background of the environment can be associated with one or more objects (e.g., a bookshelf behind the person sitting at the computing system, a poster hanging on the wall, and the like). The computing system can identify the one or more objects in the background of the video data based upon the one or more pixels (e.g., using object recognition models). The computing system can then determine a distance of the entire object of the one or more other objects from the range sensor based on the other location data of the one or more pixels that comprise the entire object. In this way, even though certain objects in the background may have different distance measurements associated with different points on the object, the entire object can be identified as a singular entity in the background of the environment.

The computing system can then apply a higher amount of blur to at least one object of the one or more other objects that has a greater distance from the range sensor than at least one other object of the one or more other objects. In this way, objects that are in the background are uniformly blurred despite having different distances associated with different points on the object. For example, if a cup on a shelf is closer to the subject object (e.g., a person in the video data) than a poster hanging on a wall behind the subject object, the cup can be uniformly blurred at a first, lower degree blur than the poster on the wall.

Because the amount of blur depends on the distance between each object or point in the background of the environment and the video capture device, the blur is said to be "dynamic," in that different amounts of blur can be applied to different objects or points based on the distance from the video capture device.

Figure 7:
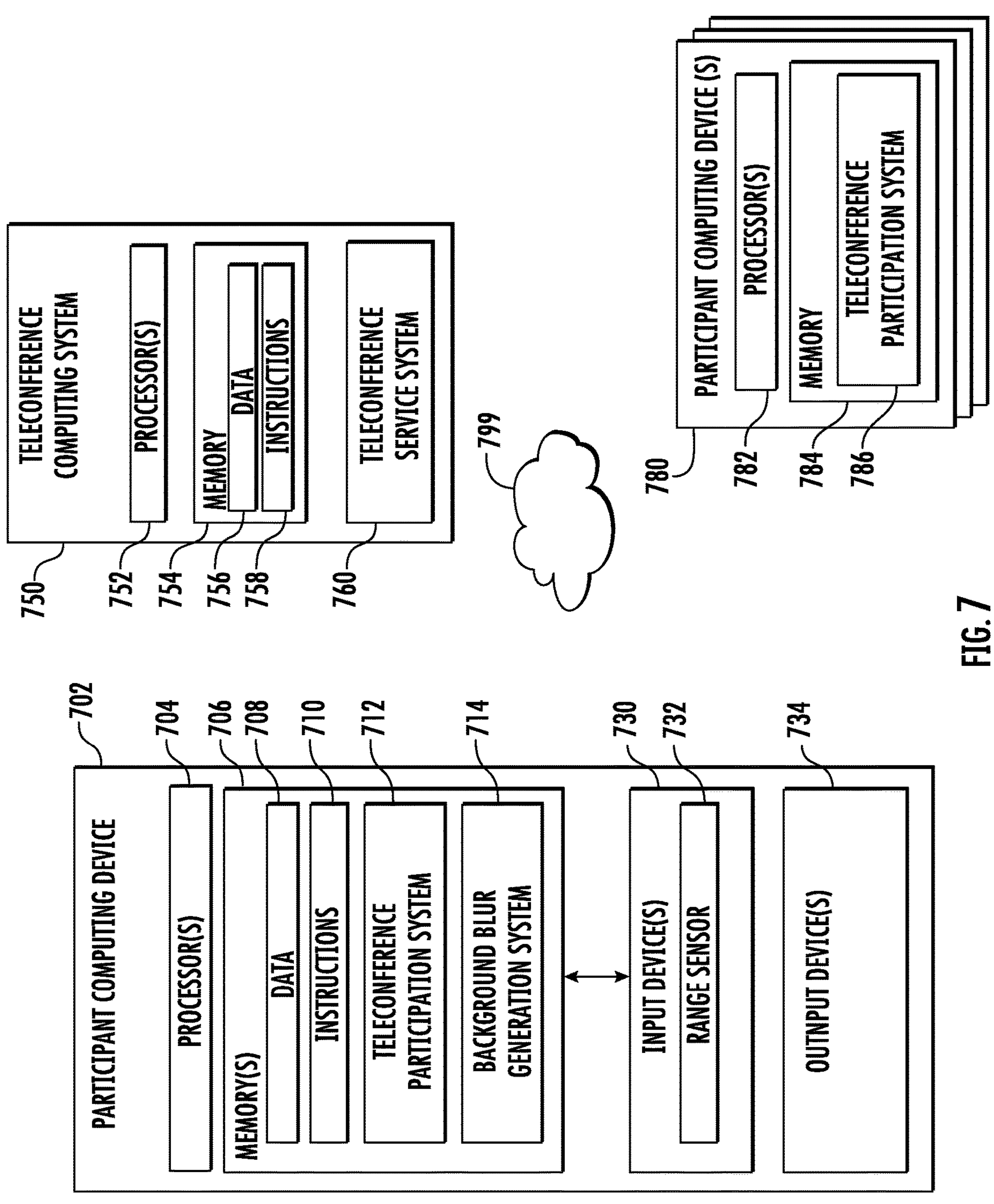
FIG. 7 depicts a block diagram of an example computing environment that performs video blurring according to example implementations of the present disclosure.

FIG. 7 depicts a block diagram of an example computing environment 700 that performs video blurring according to example implementations of the present disclosure. The computing environment 700 includes a participant computing device 702 that is associated with a participant in a teleconference, a teleconference computing system 750, and, in some implementations, other participant computing device(s) 780 respectively associated with other participants(s) in the teleconference.

The participant computing device 702 can be any type of computing device, such as, for example, a personal computing device (e.g., laptop or desktop), a mobile computing device (e.g., smartphone or tablet), a gaming console or controller, a wearable computing device (e.g., an virtual/augmented reality device, etc.), an embedded computing device, a broadcasting computing device (e.g., a webcam, etc.), etc.

In particular, the participant computing device 702 can, in some implementations, be a computing system for video blurring. For example, the participant computing device 702 can perform video blurring for a participant's video feed in a teleconference.

The participant computing device 702 includes processor(s) 704 and memory(s) 706. The processor(s) 704 can be any suitable processing device (e.g., a processor core, a microprocessor, an ASIC, an FPGA, a controller, a microcontroller, etc.) and can be one processor or processors that are operatively connected. The memory 706 can include non-transitory computer-readable storage media(s), such as RAM, ROM, EEPROM, EPROM, flash memory devices, magnetic disks, etc., and combinations thereof. The memory 706 can store data 708 and instructions 710 which are executed by the processor 704 to cause the participant computing device 702 to perform operations.

In particular, the memory 706 of the participant computing device 702 can include a teleconference participation system 712. The teleconference participation system 712 can facilitate participation in a teleconference by a participant associated with the participant computing device 702 (e.g., a teleconference hosted or otherwise orchestrated by teleconference computing system 750, etc.). To facilitate teleconference participation, the teleconference participation system 712 can include service module(s) which, by providing various services, can collectively facilitate participation in a teleconference.

The memory 706 of the participant computing device 702 can also include a background blur generation system 714. The background blur generation system 714 receives both location data (e.g., distances from the participant user device 702 to various objects in the environment) from a distance sensor and video data from a video capture device. Based on the received location data and the received video data, the background blur generation system 714 determines a zone of inclusion for the video data. The zone of inclusion represents a subject of the video data (e.g., a person sitting at a computer or another object) that is closest to the participant user device 702 (determined based on the received location data) as a group of pixels. Pixels within this zone are left unblurred and any pixels of the video data that are outside the zone of inclusion (defined by a boundary of exclusion, which is a boundary of pixels representing the edge of the subject of the video) are determined to be in the background of the video. The pixels determined to be in the background of the video by the background blur generation system 614 are then blurred by the background blur generation system 714. The pixels are continuously blurred without disruption (e.g., without stopping blurring of pixels near the outline of a subject if the subject moves).

The participant computing device 702 can also include input device(s) 730 that receive inputs from a participant, or otherwise capture data associated with a participant. For example, the input device(s) 730 can include a touch-sensitive device (e.g., a touch-sensitive display screen or a touch pad) that is sensitive to the touch of a participant input object (e.g., a finger or a stylus). The touch-sensitive device can serve to implement a virtual keyboard. Other example participant input components include a microphone, a traditional keyboard, or other means by which a participant can provide user input.

In some implementations, the participant computing device 702 can include, or can be communicatively coupled to, input device(s) 730. For example, the input device(s) 730 can include a camera device that can capture two-dimensional video data of a participant associated with the participant computing device 702 (e.g., for broadcasting, etc.). In some implementations, the input device(s) 730 can include a number of camera devices communicatively coupled to the participant computing device 702 that are configured to capture image data from different perspectives for generation of three-dimensional pose data/representations (e.g., a representation of a user of the participant computing device 702, etc.).

In some implementations, the input device(s) 730 can include sensor devices configured to capture sensor data indicative of movements of a participant associated with the participant user device 702 (e.g., accelerometer(s), Global Positioning Satellite (GPS) sensor(s), gyroscope(s), infrared sensor(s), head tracking sensor(s) such as magnetic capture system(s), an omni-directional treadmill device, sensor(s) configured to track eye movements of the user, etc.).

In particular, the input device(s) 730 can include a range sensor 732. The range sensor 732 can be similar to range sensor 220 as described above with regards to FIG. 2.

In some implementations, the participant computing device 702 can include, or be communicatively coupled to, output device(s) 734. Output device(s) 734 can be, or otherwise include, device(s) configured to output audio data, image data, video data, etc. For example, the output device(s) 734 can include a two-dimensional display device (e.g., a television, projector, smartphone display device, etc.). For another example, the output device(s) 734 can include display devices for an augmented reality device or virtual reality device.

The teleconference computing system 750 includes processor(s) 752 and a memory 754. The processor(s) 752 can be any suitable processing device (e.g., a processor core, a microprocessor, an ASIC, an FPGA, a controller, a microcontroller, etc.) and can be one processor or processors that are operatively connected. The memory 754 can include non-transitory computer-readable storage media(s), such as RAM, ROM, EEPROM, EPROM, flash memory devices, magnetic disks, etc., and combinations thereof. The memory 754 can store data 756 and instructions 758 which are executed by the processor 752 to cause the teleconference computing system 750 to perform operations.

In some implementations, the teleconference computing system 750 can be, or otherwise include, a virtual machine or containerized unit of software instructions executed within a virtualized cloud computing environment (e.g., a distributed, networked collection of processing devices), and can be instantiated on request (e.g., in response to a request to initiate a teleconference, etc.). Additionally, or alternatively, in some implementations, the teleconference computing system 750 can be, or otherwise include, physical processing devices, such as processing nodes within a cloud computing network (e.g., nodes of physical hardware resources).

The teleconference computing system 750 can facilitate the exchange of communication data within a teleconference using the teleconference service system 760. More specifically, the teleconference computing system 750 can utilize the teleconference service system 760 to encode, broadcast, and/or relay communications signals (e.g., audio input signals, video input signals, etc.), host chat rooms, relay teleconference invites, provide web applications for participation in a teleconference (e.g., a web application accessible via a web browser at a teleconference computing system, etc.), etc.

More generally, the teleconference computing system 750 can utilize the teleconference service system 760 to handle any frontend or backend services directed to providing a teleconference. For example, the teleconference service system 760 can receive and broadcast (i.e., relay) data (e.g., video data, audio data, etc.) between the participant computing device 702 and participant computing device(s) 780. For another example, the teleconference service system 760 can facilitate direct communications between the participant computing device 702 and participant computing device(s) 780 (e.g., peer-to-peer communications, etc.). A teleconferencing service can be any type of application or service that receives and broadcasts data from multiple participants. For example, in some implementations, the teleconferencing service can be a videoconferencing service that receives data (e.g., audio data, video data, both audio and video data, etc.) from some participants and broadcasts the data to other participants.

As an example, the teleconference service system 760 can provide a videoconference service for multiple participants. One of the participants can transmit audio and video data to the teleconference service system 760 using a participant device (e.g., participant computing device 702, etc.). A different participant can transmit audio data to the teleconference service system 760 with a different participant computing device. The teleconference service system 760 can receive the data from the participants and broadcast the data to each computing system.

As another example, the teleconference service system 760 can implement an augmented reality (AR) or virtual reality (VR) conferencing service for multiple participants. One of the participants can transmit AR/VR data sufficient to generate a three-dimensional representation of the participant to the teleconference service system 760 via a device (e.g., video data, audio data, sensor data indicative of a pose and/or movement of a participant, etc.). The teleconference service system 760 can transmit the AR/VR data to devices of the other participants. In such fashion, the teleconference service system 760 can facilitate any type or manner of teleconferencing services to multiple participants.

It should be noted that the teleconference service system 760 can facilitate the flow of data between participants (e.g., participant computing device 702, participant computing device(s) 780, etc.) in any manner that is sufficient to implement the teleconference service. In some implementations, the teleconference service system 760 can be configured to receive data from participants, decode the data, encode the data, broadcast the data to other participants, etc. For example, the teleconference service system 760 can receive encoded video data from the participant computing device 702. The teleconference service system 760 can decode the video data according to a video codec utilized by the participant computing device 702. The teleconference service system 760 can encode the video data with a video codec and broadcast the data to participant computing devices.

In some implementations, the teleconference computing system 750 includes, or is otherwise implemented by, server computing device(s). In instances in which the teleconference computing system 750 includes multiple server computing devices, such server computing devices can operate according to sequential computing architectures, parallel computing architectures, or some combination thereof.

In some implementations, the transmission and reception of data by teleconference computing system 750 can be accomplished via the network 799. For example, in some implementations, the participant computing device 702 can capture video data, audio data, multimedia data (e.g., video data and audio data, etc.), sensor data, etc. and transmit the data to the teleconference computing system 750. The teleconference computing system 750 can receive the data via the network 799.

In some implementations, the teleconference computing system 750 can receive data from the participant computing device(s) 702 and 780 according to various encryption scheme(s) (e.g., codec(s), lossy compression scheme(s), lossless compression scheme(s), etc.). For example, the participant computing device 702 can encode audio data with an audio codec, and then transmit the encoded audio data to the teleconference computing system 750. The teleconference computing system 750 can decode the encoded audio data with the audio codec. In some implementations, the participant computing device 702 can dynamically select between a number of different codecs with varying degrees of loss based on conditions (e.g., available network bandwidth, accessibility of hardware/software resources, etc.) of the network 799, the participant computing device 702, and/or the teleconference computing system 750. For example, the participant computing device 702 can dynamically switch from audio data transmission according to a lossy encoding scheme to audio data transmission according to a lossless encoding scheme based on a signal strength between the participant computing device 702 and the network 799.

The teleconference computing system 750 and the participant computing device 702 can communicate with the participant computing device(s) 780 via the network 799. The participant computing device(s) 780 can be any type of computing device(s), such as, for example, a personal computing device (e.g., laptop or desktop), a mobile computing device (e.g., smartphone or tablet), a gaming console or controller, a wearable computing device (e.g., an virtual/augmented reality device, etc.), an embedded computing device, a broadcasting computing device (e.g., a webcam, etc.), or any other type of computing device.

The participant computing device(s) 780 includes processor(s) 782 and a memory 784 as described with regards to the participant computing device 702. Specifically, the participant computing device(s) 780 can be the same, or similar, device(s) as the participant computing device 702. For example, the participant computing device(s) 780 can each include a teleconference participation system 786 that includes at least some of the modules 714 of the teleconference participation system 712. For another example, the participant computing device(s) 780 may include, or may be communicatively coupled to, the same type of input and output devices as described with regards to input device(s) 730 and output device(s) 734 (range sensor 732, etc.). Alternatively, in some implementations, the participant computing device(s) 780 can be different devices than the participant computing device 702, but can also facilitate teleconferencing with the teleconference computing system 750. For example, the participant computing device 702 can be a laptop and the participant computing device(s) 780 can be smartphone(s).

The network 799 can be any type of communications network, such as a local area network (e.g., intranet), wide area network (e.g., Internet), or some combination thereof and can include any number of wired or wireless links. In general, communication over the network 799 can be carried via any type of wired and/or wireless connection, using a wide variety of communication protocols (e.g., TCP/IP, HTTP. SMTP, FTP), encodings or formats (e.g., HTML, XML), and/or protection schemes (e.g., VPN, secure HTTP, SSL).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

The following definitions provide a detailed description of various terms discussed throughout the subject specification. As such, it should be noted that any previous reference in the specification to the following terms should be understood in light of these definitions.

Teleconference: as used herein, the term "teleconference" generally refers to any communication or live exchange of data (e.g., audio data, video data, AR/VR data, etc.) between multiple participant computing devices. The term "teleconference" encompasses a videoconference, an audioconference, a media conference, an Augmented Reality (AR)/Virtual Reality (VR) conference, and/or other forms of the exchange of data (e.g., communications data) between participant computing devices. As an example, a teleconference can refer to a videoconference in which multiple participant computing devices broadcast and/or receive video data and/or audio data in real-time or near real-time. As another example, a teleconference can refer to an AR/VR conferencing service in which AR/VR data (e.g., pose data, image data, positioning data, audio data, etc.) sufficient to generate a three-dimensional representation of a participant is exchanged amongst participant computing devices in real-time. As yet another example, a teleconference can refer to a conference in which audio signals are exchanged amongst participant computing devices over a mobile network. As yet another example, a teleconference can refer to a media conference in which one or more different types or combinations of media or other data are exchanged amongst participant computing devices (e.g., audio data, video data, AR/VR data, a combination of audio and video data, etc.).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for performing background blurring in video data, the method comprising:

receiving, by a computing system comprising one or more computing devices, video data from a video capture device, wherein the video capture device is a user device in communication with one or more participant devices via a network;

determining, by the computing system, location data for a user in the video data using a sensor, wherein the location data indicates a distance of the user from the video capture device;

determining, by the computing system, a zone of inclusion for the video data based on the video data and the location data by identifying pixels in the video data associated with physical distances within a threshold range of distances;

applying, by the computing system, background blur to pixels of the video data located outside the zone of inclusion; and communicating, by the computing system, the video data to the one or more participant devices via the network.

2. The computer-implemented method of claim 1, wherein the sensor is a range sensor selected from a group of range sensors consisting of a radar sensor and a lidar sensor.

3. The computer-implemented method of claim 1, wherein determining location data for the user in the video data comprises:

identifying, by the computing system, one or more pixels of the video having distances from the sensor within a shared range; and identifying, by the computing system, the presence of the user based on the one or more pixels.

4. The computer-implemented method of claim 3, wherein the one or more pixels are indicative of the user being a closest user in the video data to the sensor.

5. The computer-implemented method of claim 4, wherein the zone of inclusion comprises the one or more pixels.

6. The computer-implemented method of claim 5, wherein the one or more pixels are unblurred, and wherein all pixels in the video data that are not the one or more pixels are blurred.

7. The computer-implemented method of claim 1, wherein the zone of inclusion is defined by a boundary of exclusion, and wherein pixels within the boundary of exclusion are unblurred and all pixels outside the boundary of exclusion are blurred.

8. The computer-implemented method of claim 1, wherein the sensor collects data indicative of the distance of the user from the video capture device and provides the data to the computing system as the location data.

9. The computer-implemented method of claim 1, wherein the sensor is a second video capture device and the location data comprises video data from the video capture device and the second video capture device, and wherein determining the zone of inclusion includes:

determining, based on the location data, a distance of the user from the video capture device using parallax to determine a location of the user in the video data.

* * * * *